(12) United States Patent
Konishi

(10) Patent No.: US 9,001,357 B2
(45) Date of Patent: Apr. 7, 2015

(54) OPERATING DEVICE AND IMAGE FORMING APPARATUS STORING WORKFLOWS INCLUDING EACH A PLURALITY OF PROCESSING ITEMS

(75) Inventor: Kohei Konishi, Osaka (JP)

(73) Assignee: Kyocera Mita Corporation (JP)

(*) Notice: Subject to any disclaimer, the term of this patent is extended or adjusted under 35 U.S.C. 154(b) by 1093 days.

(21) Appl. No.: 13/012,210

(22) Filed: Jan. 24, 2011

(65) Prior Publication Data
US 2011/0188077 A1     Aug. 4, 2011

(30) Foreign Application Priority Data
Feb. 3, 2010   (JP) ................................. 2010-021850

(51) Int. Cl.
G06F 3/12     (2006.01)
(52) U.S. Cl.
CPC ........................................ G06F 3/12 (2013.01)
(58) Field of Classification Search
None
See application file for complete search history.

(56) References Cited

U.S. PATENT DOCUMENTS

| | | | | |
|---|---|---|---|---|
| 7,215,434 B1 * | 5/2007 | Janse et al. | .................... | 358/1.15 |
| 2004/0223167 A1 * | 11/2004 | Yu | .................... | 358/1.1 |
| 2007/0133045 A1 * | 6/2007 | Kubota | .................... | 358/1.15 |
| 2009/0213407 A1 * | 8/2009 | Kamiya | .................... | 358/1.13 |
| 2010/0091327 A1 * | 4/2010 | Tamura | .................... | 358/1.15 |

FOREIGN PATENT DOCUMENTS

| | | |
|---|---|---|
| JP | 2006-1242 | 1/2006 |
| JP | 200970291 | 4/2009 |

* cited by examiner

*Primary Examiner* — Marcellus Augustin
*Assistant Examiner* — Mesfin Getaneh
(74) *Attorney, Agent, or Firm* — Gerald E. Hespos; Michael J. Porco; Matthew T. Hespos (57) ABSTRACT

An operating device is provided with a display unit; a storage storing a plurality of workflows, each of which is composed of a combination of a predetermined plurality of processing items out of a plurality of processing items of an image forming apparatus including the operating device, in advance; a first selection input section for inputting the selection of a processing item out of the plurality of processing items of the image forming apparatus; a searching section for searching a workflow including the same processing item as the selected processing item from the plurality of workflows stored in the storage when the selection of the processing item is input by the first selection input section; and a display controller for controlling the display unit to display an image indicating the extracted workflow as a search result by the searching section.

18 Claims, 9 Drawing Sheets

| WORKFLOW | PROCESSING ITEM |
|---|---|
| COLLECTIVE COPY | DUPLEX COPY, AGGREGATE COPY |
| MAGAZINE CREATION | DUPLEX COPY, AGGREGATE COPY, FRONT COVER SETTING, STAPLE, DOCUMENT IMAGE QUALITY |
| ⋮ | ... |

OPERATING DEVICE AND IMAGE FORMING APPARATUS STORING WORKFLOWS INCLUDING EACH A PLURALITY OF PROCESSING ITEMS

BACKGROUND OF THE INVENTION

1. Field of the Invention

The present invention relates to an operating device provided, for example, in an image forming apparatus.

2. Description of the Related Art

Since a digital complex machine as an example of an image forming apparatus has many functions, there are many items to be set using an operation/display unit of the image forming apparatus (set items). Thus, all the set items cannot be displayed on one screen in the operation/display unit and hierarchical display is made on the screen. Therefore, there are cases where it cannot be known where necessary set items are.

There has been proposed, for example, a technology for searching a set item using a keyword corresponding to the set item and a keyword corresponding to a set target.

There has been proposed a technology called a "workflow" utilizing an image forming apparatus. The workflow is composed of a combination of a predetermined plurality of set items out of a plurality of set items of the image forming apparatus. For example, a "magazine creation" workflow is prepared for a user who wants to create a magazine utilizing the image forming apparatus. The "magazine creation" workflow is a combination of processing items (duplex copy, staple, addition of a front cover, etc.) necessary to create the magazine. The user selects the "magazine creation" workflow on an operation screen of an operation/display unit of the image forming apparatus and enters set values for the processing items in accordance with instructions displayed on the operation screen if necessary. Then, when the user operates a start key to cause the image forming apparatus to perform the workflow, a magazine can be created.

Workflows are convenient functions for users. However, some users have no knowledge of the workflows. If many workflows are prepared, users may not grasp all the workflows. The above technology is for searching the set items, but not for searching the workflows.

SUMMARY OF THE INVENTION

An object of the present invention is to provide an operating device and an image forming apparatus capable of searching a workflow suitable for a user and informing it to him.

In order to accomplish this object, one aspect of the present invention is directed to an operating device, having a display unit; a storage storing a plurality of workflows, each of which is composed of a combination of a predetermined plurality of processing items out of a plurality of processing items of an image forming apparatus including the operating device, in advance; a first selection input section for inputting the selection of a processing item out of the plurality of processing items of the image forming apparatus; a searching section for searching a workflow including the same processing item as the selected processing item from the plurality of workflows stored in the storage when the selection of the processing item is input by the first selection input section; and a display controller for controlling the display unit to display an image indicating the extracted workflow as a search result by the searching section.

Another aspect of the present invention is directed to an image forming apparatus, having the operating device; and an image forming unit for performing an image forming operation on a sheet based on a set value of a processing item set in the operating device.

These and other objects, features and advantages of the present invention will become more apparent upon reading the following detailed description along with the accompanying drawings.

DETAILED DESCRIPTION OF THE PREFERRED EMBODIMENTS

Figure 1:
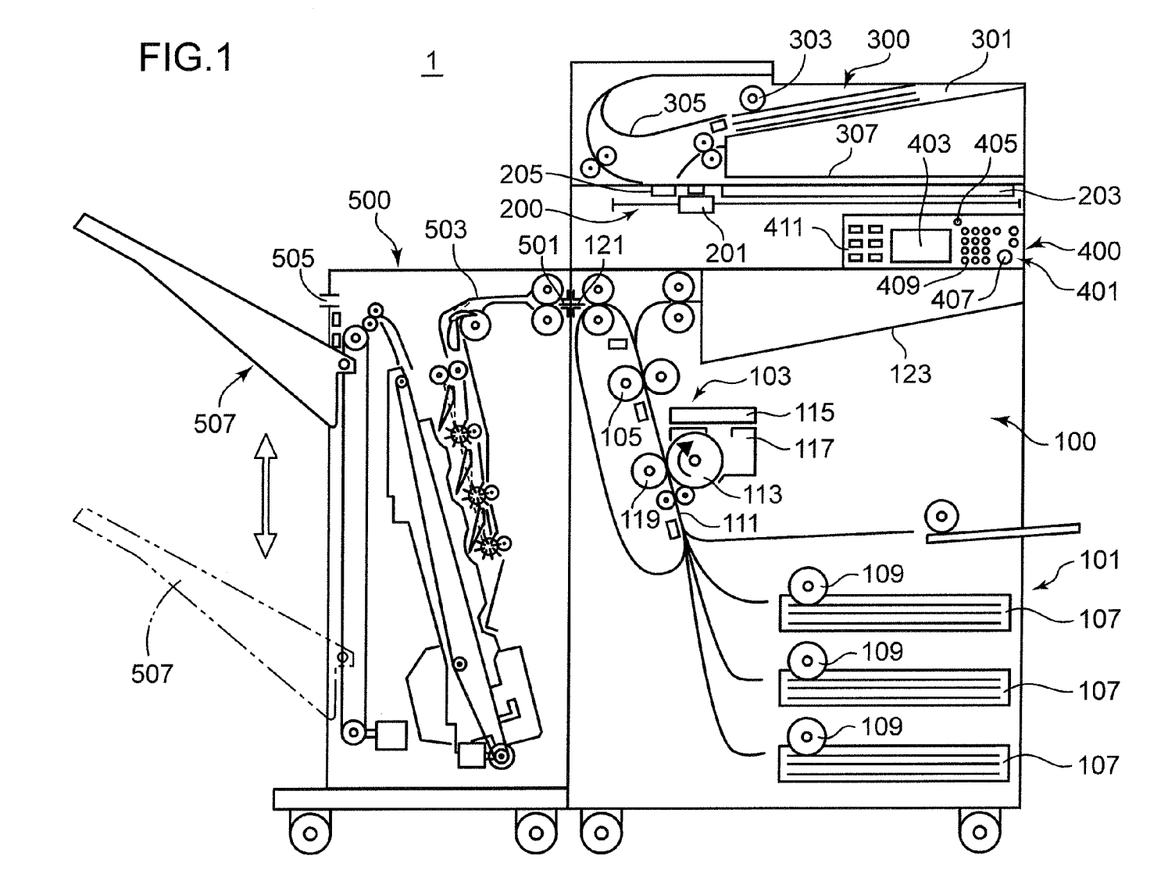
FIG. 1 is a diagram schematically showing an internal construction of an image forming apparatus according to a first embodiment of the invention.

Hereinafter, embodiments of the present invention are described in detail with reference to the drawings. FIG. 1 is a diagram schematically showing an internal construction of an image forming apparatus 1 according to a first embodiment of the present invention. The image forming apparatus 1 may be, for example, a digital complex machine having copy, printer, scanner and facsimile functions. The image forming apparatus 1 is provided with an apparatus main body 100, a document reading unit 200 arranged on the apparatus main body 100, a document feeding unit 300 arranged on the document reading unit 200, an operation unit 400 arranged on the front surface of an upper part of the apparatus main body 100, and a sheet post-processing unit 500 arranged on a sheet discharge side, i.e. on the left side of the apparatus main body 100.

The document feeding unit 300 includes a document placing portion 301, a feed roller 303, a document conveyor 305 and a document discharging portion 307. The feed roller 303 feeds documents set on the document placing portion 301 one by one. The document conveyor 305 conveys a fed document to the document reading unit 200. The document has an image thereof read by the document reading unit 200 and is then discharged onto the document discharging portion 307. In this way, the document feeding unit 300 functions as an automatic document feeder and can successively feed a plurality of documents placed on the document placing portion 301 to the document reading unit 200.

The document reading unit 200 includes a carriage 201 with an exposure lamp and the like, a document platen 203 formed by a transparent member such as glass, an unillustrated CCD (Charge Coupled Device) sensor, and a document reading slit 205. In the case of reading a document placed on the document platen 203, the document is read by the CCD sensor while the carriage 201 is moved in a longitudinal direction of the document platen 203. In contrast, in the case of reading a document fed by the document feeding unit 300, the carriage 201 is moved to a position facing the document reading slit 205 and the document fed by the document feeding unit 300 is read by the CCD sensor via the document reading slit 205. The CCD sensor outputs a read document image as an image data.

The apparatus main body 100 includes a sheet storage unit 101, an image forming unit 103 and a fixing unit 105. The sheet storage unit 101 is arranged in a bottommost part of the apparatus main body 100 and includes sheet cassettes 107 in each of which a stack of sheets can be stored. An uppermost sheet in the sheet stack stored in each sheet tray 107 is fed toward a sheet conveying unit 111 by driving a pickup roller 109. The sheet is conveyed to the image forming unit 103 via the sheet conveying unit 111.

The image forming unit 103 forms a toner image on a sheet conveyed thereto. The image forming unit 103 includes a photoconductive drum 113, an exposure device 115, a developing device 117 and a transfer device 119. The exposure device 115 generates a beam modulated in accordance with an image data (image data output from the document reading unit 200, image data transmitted from a personal computer, facsimile received image data, or the like) and irradiates a uniformly charged circumferential surface of the photoconductive drum 113 with this beam. In this way, an electrostatic latent image corresponding to the image data is formed on the circumferential surface of the photoconductive drum 113. In this state, toner is supplied to the circumferential surface of the photoconductive drum 113 by the developing device 117, whereby a toner image corresponding to the image data is formed on the circumferential surface. This toner image is transferred to a sheet conveyed from the sheet storage unit 101 described above by the transfer device 119.

The sheet having the toner image transferred thereto is fed to the fixing unit 105. In the fixing unit 105, heat and pressure are applied to the toner image and the sheet, whereby the toner image is fixed to the sheet. In this way, printing of the image on the sheet is completed. In the case of applying post-processing to this printed sheet, the printed sheet is conveyed to the sheet post-processing unit 500 through a sheet discharge port 121 of the apparatus main body 100. In contrast, in the case of applying no post-processing, the printed sheet is discharged to a discharge tray 123.

In the sheet post-processing unit 500, post-processings such as sorting, stapling, punching and saddle stitching are applied to printed sheet(s). The sheet post-processing unit 500 includes a sheet carry-in port 501, a sheet conveying unit 503, a sheet carry-out port 505, a stack tray 507, etc. The sheet conveying unit 503 successively conveys printed sheets brought to the sheet carry-in port 501 through the sheet discharge port 121 and carries out the printed sheets having the post-processing applied thereto to the stack tray 507 through the sheet carry-out port 505. The stack tray 507 is so constructed as to be vertically movable in arrow directions according to the number of sheets carried out through the sheet carry-out port 505.

Figure 2:
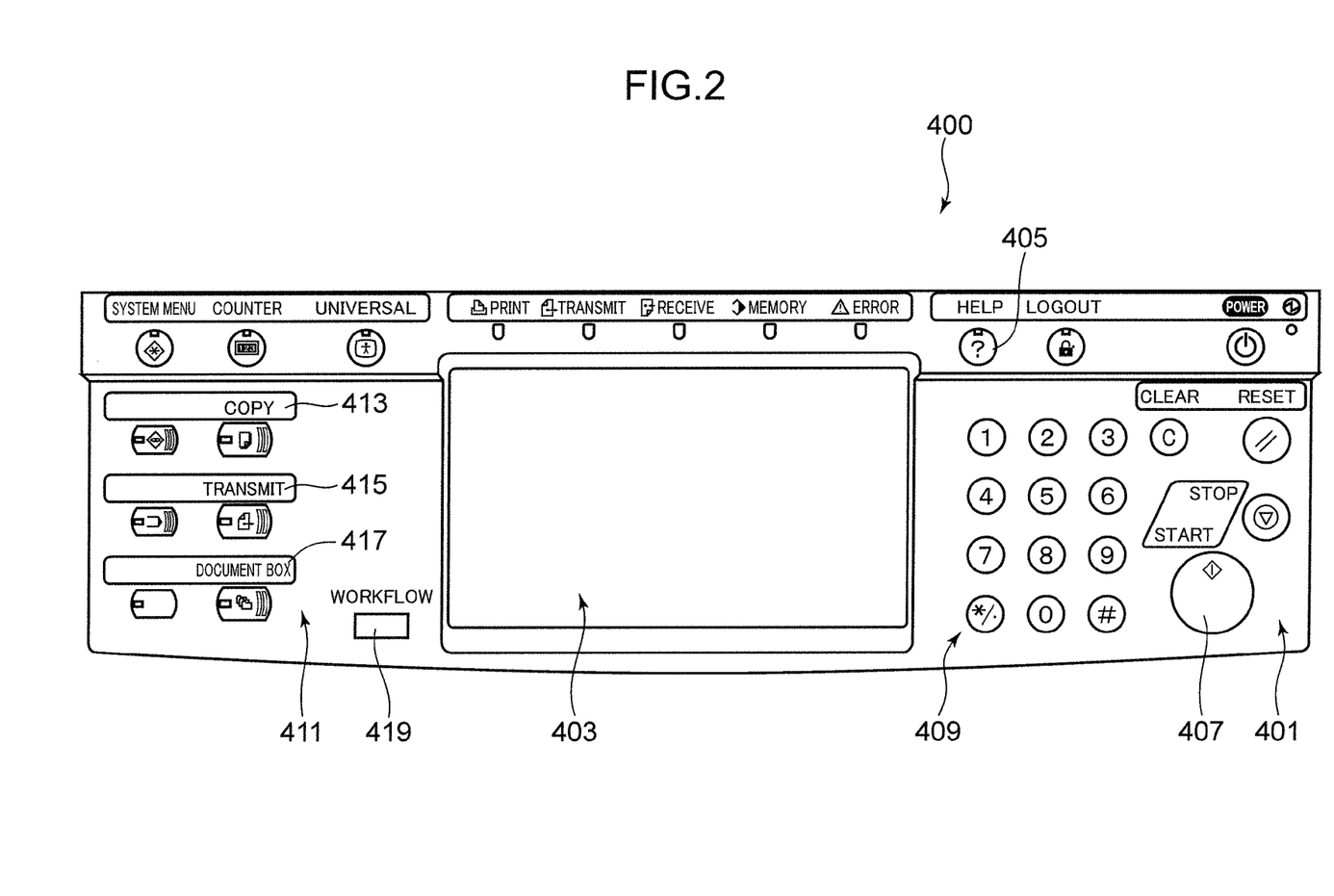
FIG. 2 is an enlarged plan view of an operation unit provided in the image forming apparatus.

The operation unit 400 includes an operation key unit 401 and a display unit 403. The operation unit 400 is described with reference to FIG. 2. FIG. 2 is an enlarged plan view of the operation unit 400. The display unit 403 is a touch panel and displays screens with soft keys. A user inputs settings necessary to execute a function such as copying by operating the soft keys while looking at the screens.

The operation key unit 401 includes operation keys which are hard keys. Specifically, it includes a help key 405, a start key 407, a numerical pad 409 and function changeover keys 411. The help key 405 is for causing the display unit 403 to display a help screen. The help screen is a screen displaying operation methods on scanner, facsimile, printer, copy and other functions.

The start key 407 is for starting an operation such as copying or facsimile transmission. The numerical pad 409 is an assembly of keys used to enter numbers such as the number of copies and facsimile numbers.

The function changeover keys 411 include a copy key 413, a transmit key 415, a box key 417, etc. and are used to switch a copy function, a transmit function and a box function to each other.

If the copy key 413 is operated, an initial screen for copy is displayed on the display unit 403. If the transmit key 415 is operated, an initial screen for facsimile transmission and mail transmission is displayed on the display unit 403.

If the box key 417 is operated, an initial screen for document box is displayed on the display unit 403. A document box function is for reading and printing data stored in the document box. One document box can be allotted to each user of the image forming apparatus 1, and data such as document image data read by the document reading unit 200, electronic mails and files are stored therein. The image forming apparatus 1 includes an HDD (Hard Disk Drive) 700 to be described later and a part of a storage area of the HDD 700 is utilized as document boxes.

A workflow key 419 is for selecting a workflow mode. A workflow is composed of a combination of a predetermined plurality of processing items out of a plurality of processing items of the image forming apparatus 1, and executed using the image forming apparatus 1. As described above, a combination of processing items (duplex copy, staple, addition of a front cover, etc.) necessary to create a magazine is prepared, for example, in a "magazine creation" workflow. This improves convenience for a user who wants to create a magazine using the image forming apparatus 1. Workflows are prepared in advance and they may be prepared by a manufacturer or by user(s).

If the workflow key 419 is operated, a workflow mode screen is displayed on the display unit 403. The user can execute a workflow, newly create a workflow, change a workflow and delete a workflow using this screen.

Figure 3:
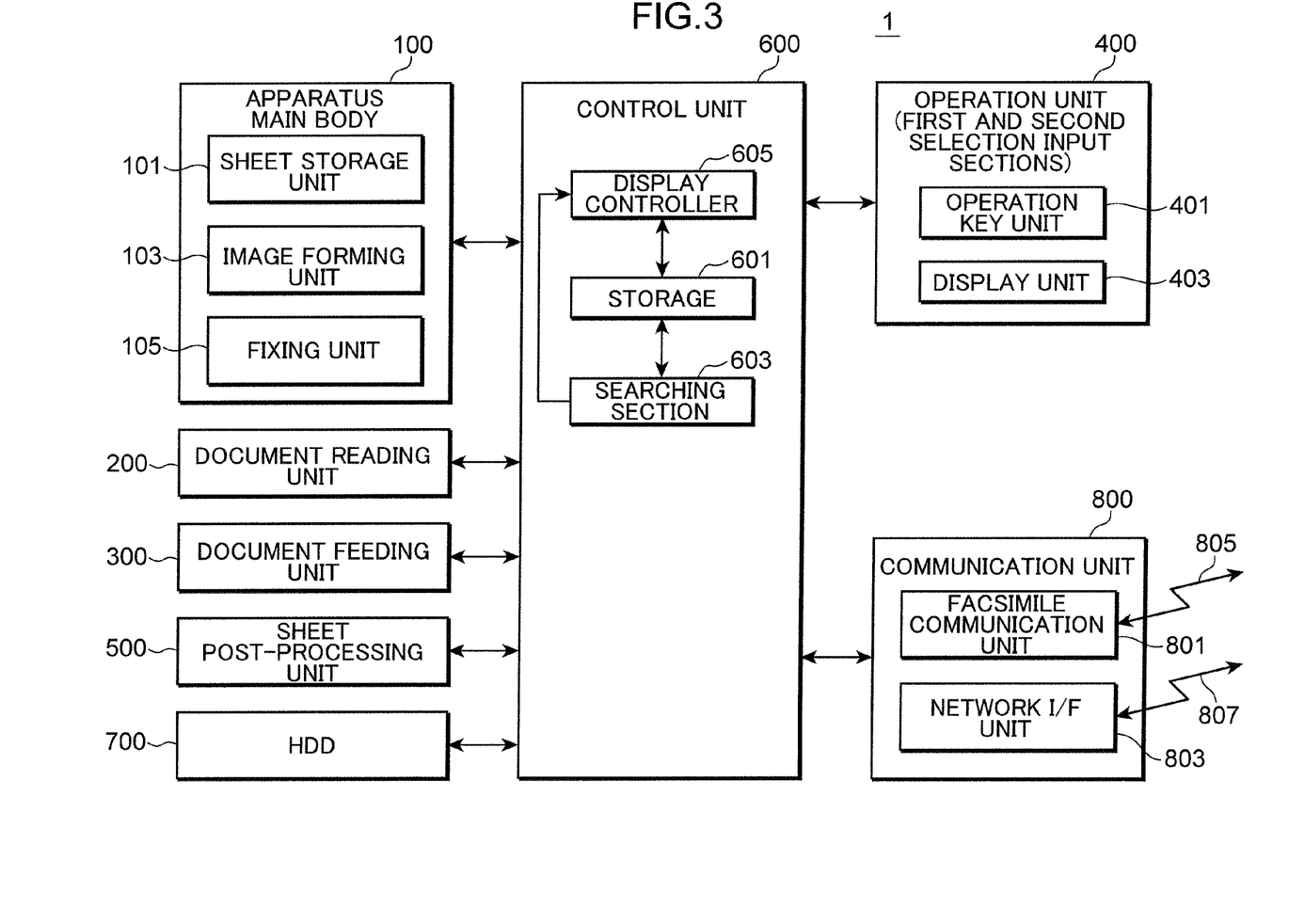
FIG. 3 is a block diagram showing an electrical construction of the image forming apparatus.

FIG. 3 is a block diagram showing an electrical construction of the image forming apparatus 1 shown in FIG. 1. The image forming apparatus 1 is constructed such that the apparatus main body 100, the document reading unit 200, the document feeding unit 300, the operation unit 400, the sheet post-processing unit 500, a control unit 600, the HDD 700 and a communication unit 800 are connected to each other by a bus. The apparatus main body 100, the document reading unit 200, the document feeding unit 300 and the sheet post-processing unit 500 are not described since they are already described.

The operation unit 400 has functions as a first selection input section and a second selection input section. The first selection input section is used to input the selection of processing item(s) out of a plurality of processing items of the image forming apparatus 1. The second selection input section is used to input the selection of a workflow with images indicating the workflows extracted by a search of a searching section to be described later displayed on the display unit 403. A second instruction receiving section includes soft keys displayed on the display unit 403 and including the images indicating the workflows extracted as a result of the search by the searching section. The operation unit 400 is an example of an operating device.

The control unit 600 includes a CPU (Central Processing Unit), a ROM (Read Only Memory), a RAM (Random Access Memory), an image memory, etc. The CPU executes a control necessary to operate the image forming apparatus 1 on the hardware constituting the image forming apparatus 1. The ROM stores software necessary for the control of the operation of the image forming apparatus 1. The RAM is used to temporarily store data generated during the execution of the software, application software and the like. The image memory temporarily stores image data (image data output from the document reading unit 200, image data transmitted from personal computers, facsimile received image data, etc.).

The control unit 600 includes a storage 601, a searching section 603 and a display controller 605. The storage 601 stores various data used to display operation screens used for the operation of the image forming apparatus 1 on the display unit 403 and image data used to display operation states of the scanner function, the facsimile function, the printer function, the copy function and the like on the display unit 403.

The storage 601 also stores a plurality of templates each composed of a combination of processing items for the function executable by the image forming apparatus 1. This template is, for example, a combination of processing items such as number of copies, sheet size, magnification, density, aggregate printing, document image quality and both side splitting applied in each function such as the copy function.

The template is used for a workflow for guiding the user how to input settings needed to be registered for the execution of the function such as the copy function or for a workflow for storing set contents (set values) of the respective processing items applied upon executing the function such as the copy function and executing the function such as the copy function with the respective set contents.

Figure 4:
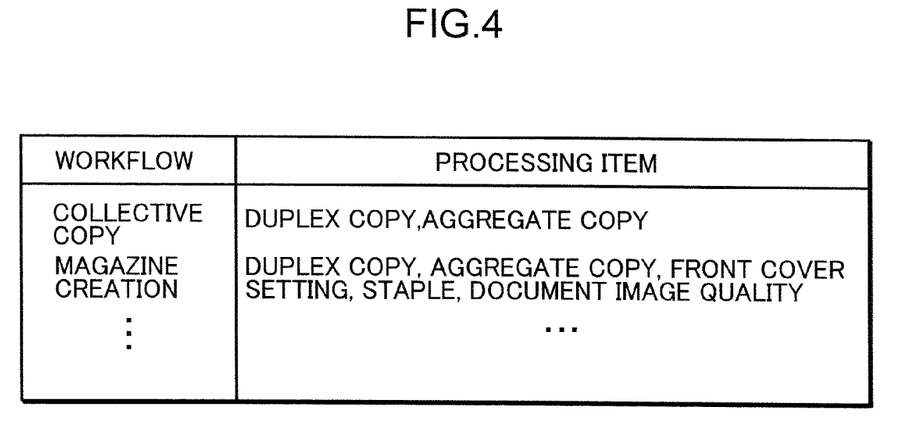
FIG. 4 is a table showing a plurality of workflows stored in a partial area of a storage of the image forming apparatus and executable in the image forming apparatus.

A plurality of workflows each composed of a combination of a predetermined plurality of processing items out of the plurality of processing items of the image forming apparatus 1 are stored in the storage 601 in advance. Specifically, the storage 601 includes an area where data on a plurality of processing items constituting the workflow are stored in correspondence with each of the stored plurality of workflows, for example, as shown in FIG. 4. The workflows are searched using the data stored in this area. The processing items are items for setting values necessary to execute the workflows using the image forming apparatus and, for example, equivalent to set items.

When the selection of the processing item is input by the above first selection input section, the searching section 603 searches the workflow including the same processing item as the selected processing item from the plurality of workflows stored in the storage 601 (FIG. 4). If the selected processing item is "duplex copy", the workflows including the "duplex copy" as the processing item are searched.

The display controller 605 controls the display of the operation screen on the display unit 403 based on the data stored in the storage 601. The display controller 605 further controls the display unit 403 to display images indicating the workflows extracted as a result of the search by the searching section 603.

The HDD 700 is used to store data such as image data output from the document reading unit 200, those transmitted from personal computers, and facsimile received image data.

As described above, the part of the storage area of the HDD 700 is used as the document boxes.

The communication unit 800 includes a facsimile communication unit 801 and a network I/F unit 803. The facsimile communication unit 801 includes an NCU (Network Control Unit) for controlling a telephone line connection with mating facsimile machines and a modulation/demodulation circuit for modulating and demodulating facsimile communication signals. The facsimile communication unit 801 is connected to a telephone line 805.

The network I/F unit 803 is connected to a LAN (Local Area Network) 807. The network I/F unit 803 is a communication interface circuit for carrying out communication with terminal units such as personal computers connected to the LAN 807.

Next, an example of an operation necessary for the execution of a workflow using the image forming apparatus 1 is described. FIGS. 5A to 5E are diagrams showing a transition of operation screens displayed on the display unit 403 in this operation. A wizard format is employed for the display screens. A control to display and switch the operation screens is executed by the display controller 605 of FIG. 3.

Figure 5A:
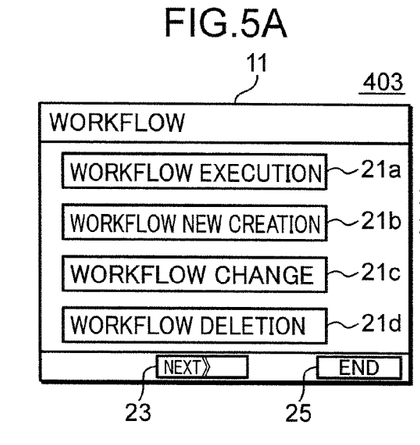
FIGS. 5A to 5E are diagrams showing a transition of operation screens displayed on a display unit in an operation necessary to execute a workflow utilizing the image forming apparatus.

When the user operates the workflow key 419 of FIG. 2, the workflow mode is set. An operation screen 11 is displayed on the display unit 403 (FIG. 5A). The operation screen 11 includes the following soft keys. A workflow execution key 21a is for selecting a workflow execution mode. A workflow new creation key 21b is for selecting a workflow new creation mode. A workflow change key 21c is for selecting a workflow change mode. A workflow deletion key 21d is for selecting a workflow deletion mode. A next key 23 is for switching the operation screen to the next one. An end key 25 is for ending the workflow mode.

Figure 5B:
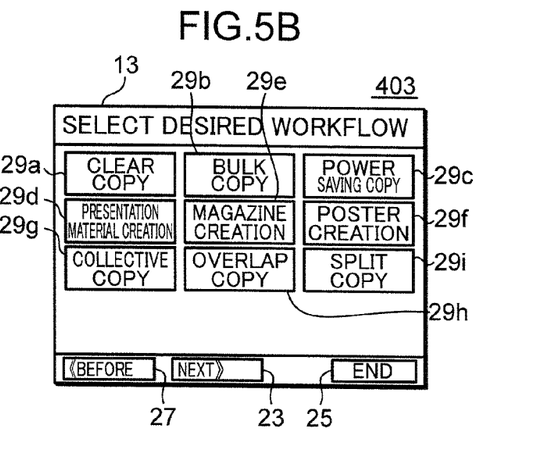

In the case of instructing an operation of the image forming apparatus 1 based on a workflow, the user operates the next key 23 after operating the workflow execution key 21a. In this way, the screen displayed on the display unit 403 is switched from the operation screen 11 to an operation screen 13 (FIG. 5B).

The operation screen 13 is for allowing the user to select a workflow from a plurality of workflows. In this embodiment, nine workflows are prepared in advance. Specifically, these workflows include "clear copy", "bulk copy", "power saving copy", "presentation material creation", "magazine creation", "poster creation", "collective copy", "overlap copy" and "split copy".

The operation screen 13 includes the following soft keys in addition to the next key 23 and the end key 25. A previous key 27 is for switching the operation screen to the previous operation screen. A clear copy key 29a is for selecting a clear copy mode. A bulk copy key 29b is for selecting a bulk copy mode. A power saving copy key 29c is for selecting a power saving copy mode. A presentation material creation key 29d is for selecting a presentation material creation mode. A magazine creation key 29e is for selecting a magazine creation mode. A poster creation key 29f is for selecting a poster creation mode. A collective copy key 29g is for selecting a collective copy mode. An overlap copy key 29h is for selecting an overlap copy mode. A split copy key 29i is for selecting a split copy mode.

Figure 5C:
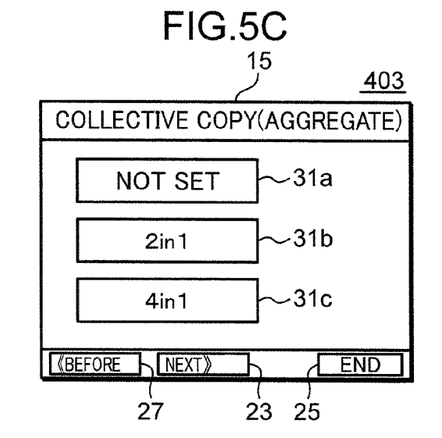

The workflow is described, taking the "collective copy" workflow as an example. A combination of duplex copy and aggregate copy is called "collective copy". Duplex copy and aggregate copy are respectively processing items. The user operates the collective copy key 29g when wanting to execute the "collective copy" workflow. When the user operates the next key 23, the screen displayed on the display unit 403 is switched from the operation screen 13 to an operation screen 15 (FIG. 5C).

Figure 5D:
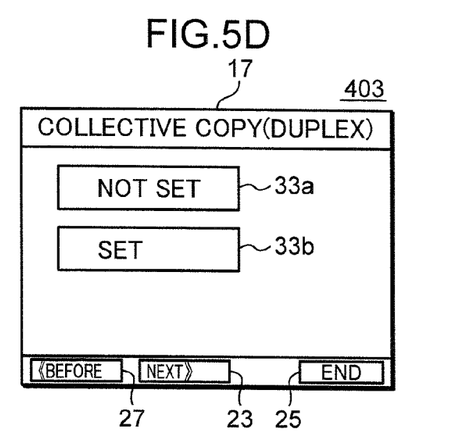

The operation screen 15 is a screen on the setting of the aggregate copy. The operation screen 15 includes the following soft keys in addition to the next key 23, the end key 25 and the previous key 27. A not-set key 31a is for selecting no setting of the aggregate copy. A 2-in-1 key 31b is for selecting setting of 2-in-1 aggregate copy. A 4-in-1 key 31c is for selecting setting of 4-in-1 aggregate copy. Here, it is assumed that the 2-in-1 key 31b is operated to set "2 in 1" as a set value. When the user operates the 2-in-1 key 31b and then operates the next key 23, the screen displayed on the display unit 403 is switched from the operation screen 15 to an operation screen (FIG. 5D).

Figure 5E:
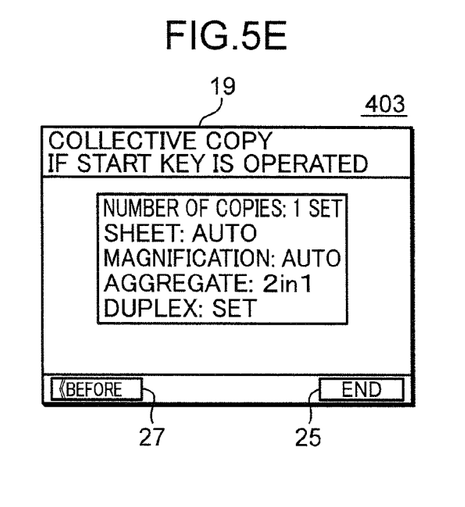

The operation screen 17 is a screen on the setting of the duplex copy. The operation screen 17 includes the following soft keys in addition to the next key 23, the end key 25 and the previous key 27. A not-set key 33a is for selecting no setting of the duplex copy. A set key 33b is for selecting setting of the duplex copy. Here, it is assumed that the set key 33b is operated to set "set" as a set value. When the user operates the next key 23, the screen displayed on the display unit 403 is switched from the operation screen 17 to an operation screen 19 (FIG. 5E).

The operation screen 19 is a screen displayed when the setting of the "collective copy" is completed, and set contents are displayed thereon. The operation screen 19 includes the end key 25 and the previous key 27. When the user operates the start key 407 shown in FIG. 2, the "collective copy" is executed using the image forming apparatus 1. The above is the description of the example of the operation necessary to execute the workflow using the image forming apparatus 1.

Figure 6:
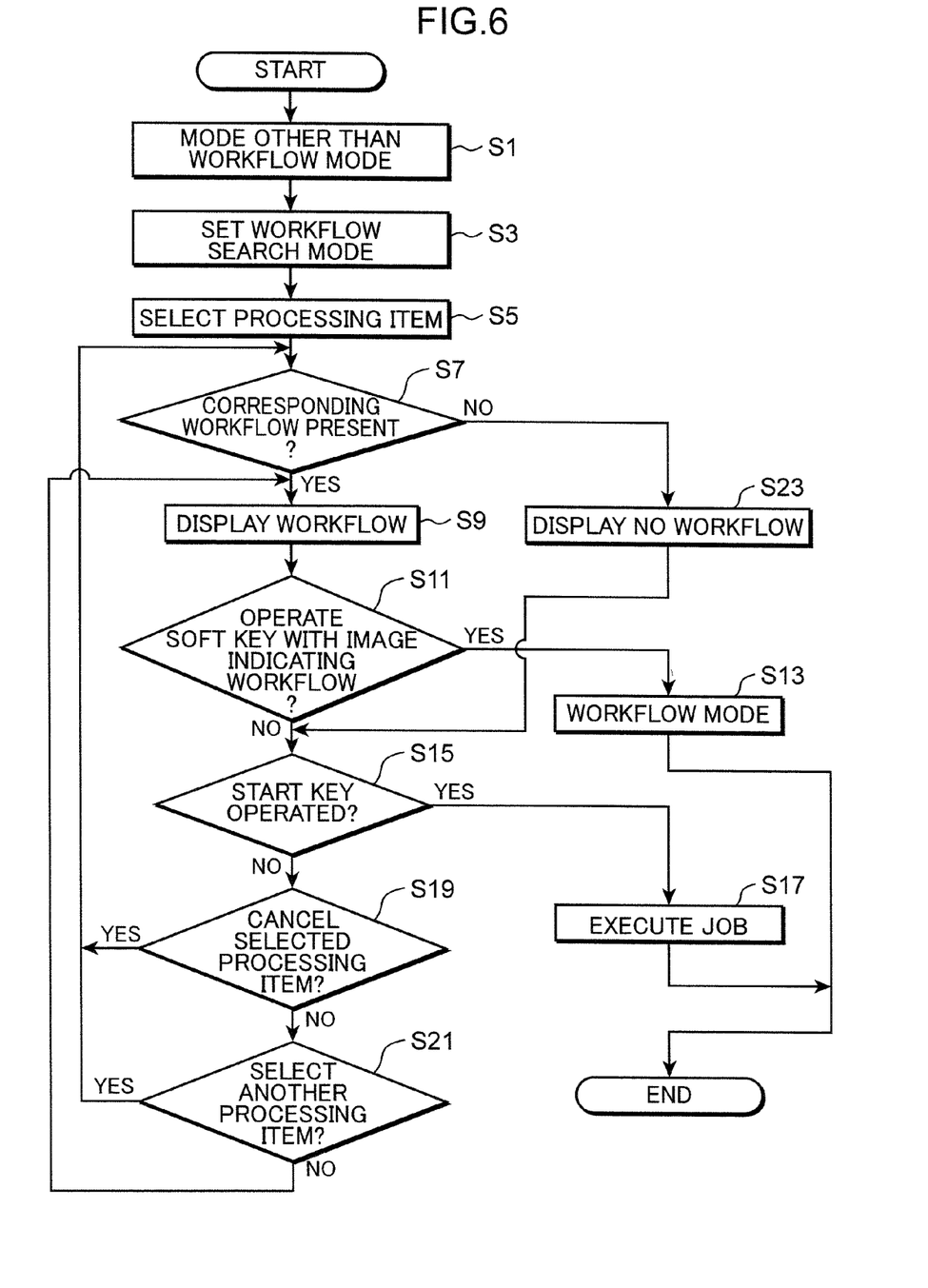
FIG. 6 is a flow chart showing a workflow search executed in the image forming apparatus.

One feature of the first embodiment is, when a processing item is selected using an menu format operation screen in a mode other than the workflow mode, to search the workflows having the same processing item as the selected processing item and display images indicating the extracted workflows as a search result. This is described with reference to FIGS. 6 and 7A to 7F. FIG. 6 is a flow chart showing a workflow search executed in the image forming apparatus 1. FIGS. 7A to 7F are diagrams showing a transition of operation screens displayed on the display unit 403 in the workflow search. The operation screens are menu format screens and controlled by the display controller 605 shown in FIG. 3. Data of the operation screens are stored in the storage 601.

The user selects a mode other than the workflow mode by operating the operation unit 400 shown in FIG. 2 (Step S1). Here, it is assumed that an application copy mode is selected.

Figure 7A:
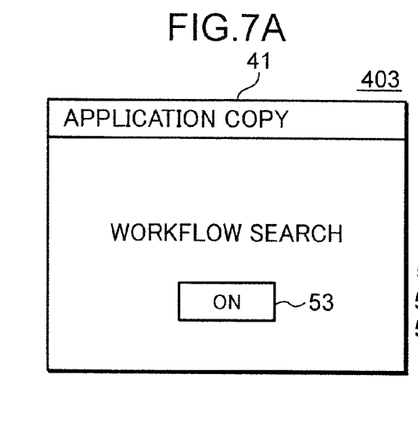
FIGS. 7A to 7F are diagrams showing a transition of operation screens displayed on the display unit in the workflow search.
Figure 7B:
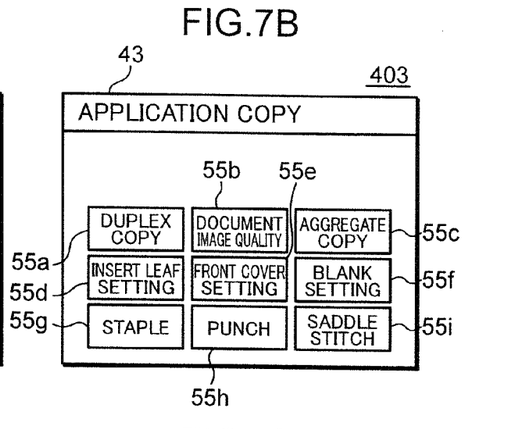

An operation screen 41 is displayed on the display unit 403 (FIG. 7A). The operation screen 41 is an initial screen for application copy and includes a workflow search key 53 which is a soft key. The user operates the workflow search key 53 upon selecting the processing item if wanting to execute a workflow search. Since the workflow search is executed here, the workflow search key 53 is operated. In this way, a workflow search mode is set by the control unit 600 (Step S3) and the screen is switched from the operation screen 41 to an operation screen 43 (FIG. 7B).

The operation screen 43 includes the following soft keys as the first selection input section. A duplex copy key 55a is for selecting the duplex copy. A document image quality key 55b is for selecting a document image quality. An aggregate copy key 55c is for selecting the aggregate copy. An insert leaf setting key 55d is for selecting insert leaf setting. A front cover setting key 55e is for selecting front cover setting. A blank setting key 55f is for selecting blank setting. A staple key 55g is for selecting stapling. A punch key 55h is for selecting punching. A saddle stitch key 55i is for selecting saddle stitching. These keys are also included on operation screens 45, 47, 49 and 51 described below. These keys are written as soft keys 55 unless it is necessary to distinguish them.

If the user wants to instruct, for example, duplex copying, he operates the duplex copy key 55a. This means to select the processing item from the plurality of processing items of the image forming apparatus 1 (Step S5). The duplex copy key 55a is equivalent to an example of the first selection input section. By the above operation of the duplex copy key 55a, the operation screen on the display unit 403 is switched from the operation screen 43 to a hierarchical operation screen (not shown) for the duplex copy. The input of set values is completed if the user inputs settings necessary for the duplex copy (e.g. setting of copying both sides of a document on both sides of a sheet) on this operation screen.

By the above operation of the duplex copy key 55a, the workflow search is executed by the searching section 603. The searching section 603 searches the workflow (s) including the duplex copy as the processing item from the plurality of workflows while referring to the data on the processing items shown in FIG. 4 and stored in the storage 601.

Figure 7C:
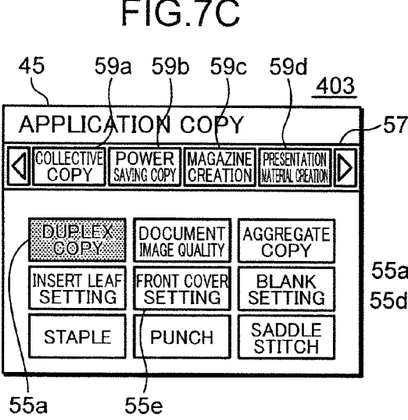

If there is any workflow including the duplex copy as the processing item (YES in Step S7), the operation screen 45 is displayed (FIG. 7C). The duplex copy key 55a is highlighted to indicate to the user that the setting of the values for the duplex copy has been completed.

Soft keys including images indicating the workflows including the duplex copy as the processing item are displayed in a workflow display area 57 of the operation screen 45 (Step S9). Here, a collective copy key 59a, a power saving copy key 59b, a magazine creation key 59c and a presentation material creation key 59d are displayed. If the number of these workflows is large and the workflows cannot fit in the display area 57, a display mode using a scroll operation is set. Note that these keys are written as the soft keys 59 unless it is necessary to distinguish them. The soft keys 59 are equivalent to the second selection input section.

If a switch to the workflow is desired, the user operates the soft key 59 indicating the workflow he wants to select while looking at the soft keys 59 (collective copy key 59a, etc.) (YES in Step S11). In this way, a switch is made to the mode of the workflow indicated by the soft key 59 the user operated (Step S13), thereby completing a workflow searching process. An operation screen (not shown) for the selected workflow is displayed on the display unit 403. For the selected processing item (here, duplex copy), the switch is made with the set values for this processing item held. Accordingly, the user can dispense with settings for the already set values. In this way, the display controller 605 controls the display unit 403 to display the operation screen for the selected workflow with the set values for the processing item selected by the first selection input section held when the selection of the workflow is input by the second selection input section. Note that the operation screen 45 may include the images indicating the workflows including the same processing item without using the soft keys 59. In this mode, the user selects the image of the workflow using a selection key provided on the operation unit 400 and operates a determination key, whereby Step S13 follows.

If a switch to the workflow is not necessary, the user does not operate the soft keys 59 including the images indicating the workflows (NO in Step S11). If wanting to execute a job in accordance with the selected processing item (here, duplex copy), the user operates the start key 407 shown in FIG. 2

(YES in Step S15). By this operation, the image forming apparatus 1 executes the above job (Step S17), thereby completing the workflow searching process.

Unless operating the start key 407 (NO in Step S15), the user can proceed to a process of canceling the selected processing item. If the soft key 55 indicating the selected processing item (highlighted key 55a) is operated, the selection of this processing item can be canceled.

Unless canceling the processing item (NO in Step S19), the user can proceed to a process of selecting another processing item. Unless the user selects another processing item (NO in Step S21), this routine returns to Step S9 and the display of the operation screen 45 continues.

If the user operates the soft key 55 indicating another processing item (YES in Step S21), e.g. if the user operates the front cover setting key 55e, the operation screen 45 is switched to a hierarchical operation screen (not shown) for front cover setting. If the user inputs settings necessary for the front cover setting on this operation screen, the input of the set values is completed. By the selection of the other processing item (YES in Step S21), Step S7 follows. Since a plurality of processing items were selected by the user, it is searched whether or not there is any workflow including all the selected plurality of processing items here. Here, the workflows including "duplex copy" and "front cover setting" as the processing items are searched. As a result, the three soft keys (magazine creation key 59c, presentation material creation key 59d, paperback book creation key 59e) including images indicating the workflows are displayed on the operation screen 47 (FIG. 7D) (Step S9). Since the soft keys 59 fit in the workflow display area 57, scroll display is not employed. In this way, if the selection of a plurality of processing items is input by the first selection input section, what is searched and extracted by the searching section 603 is workflows including all the selected plurality of processing items.

If the user selects still another processing item (YES in Step S21), e.g. if the user operates the insert leaf setting key 55d, Step S7 follows. Then, it is searched whether or not there is any workflow including all the selected processing items. Here, the workflow necessitating the input of "duplex copy", "front cover setting" and "insert leaf setting" is searched. If no workflow including all these processing items is searched (NO in Step S7), no soft key 59 including an image indicating the workflow is displayed on the operation screen 49 (FIG. 7E) (Step S23). Then, Step S15 follows.

Figure 7D:
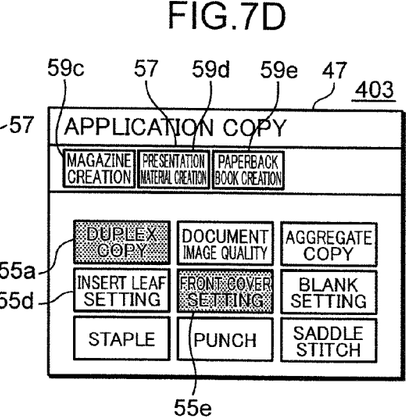

Next, if the user operates, for example, the duplex copy key 55a to cancel the selection of the "duplex copy" (NO in Step S19), Step S7 follows. Here, the workflow including the "front cover setting" and "insert leaf setting" is searched and the presentation material creation key 59d is, for example, displayed on the operation screen 51 (FIG. 7F). Since the soft key 59 fits in the workflow display area 57, no scroll display is employed.

Main effects of the first embodiment are described.

(1) As described in Steps S7 and S9, according to the first embodiment, if the user inputs the selection of the processing item from the plurality of processing items of the image forming apparatus 1 on the menu screen (e.g. operation screen 45 (FIG. 7C)) in the mode other than the workflow mode, the workflow(s) including the same processing item as the selected processing item is/are searched from the plurality of workflows stored in the storage 601. If there are any corresponding workflows, the soft keys 59 (collective copy key 59a, power saving copy key 59b, magazine creation key 59c, presentation creation key 59d) including the images indicating the workflows are displayed on the operation screen (e.g. operation screen 45).

As described above, according to the first embodiment, when the user using the menu screen as the operation screen selects the processing item, the workflow(s) suitable for the selected processing item can be visually informed to the user in real time. Thus, the workflow(s) suitable for a user can be informed to the user who has no knowledge of the workflows. Further, even if many workflows are prepared and a user does not grasp all the workflows, the workflow(s) suitable for the user can be informed.

(2) As described in Steps S11 and S13, the mode can be switched to the mode of the workflow (workflow the user wants to execute) through the operation of the soft key 59 including the image indicating the workflow. In other words, if the selection of the workflow is input by the second selection input section with the images indicating the workflows extracted by the searching section 603 displayed on the display unit 403, the operation screen (not shown) for the selected workflow is displayed on the display unit 403. Thus, the operation screen can be smoothly changed to the one for the workflow the user wants to execute during the operation using the menu screen. Since this switch is made to the operation screen for the workflow with the set value for the processing item selected by the first selection input section held, the input of the set value for this processing item can be dispensed with.

(3) The soft keys (collective copy key 59a, etc.) 59 displayed on the display unit 403 and including the images indicating the workflows extracted as a result of the search by the searching section 603 serve as the second instruction receiving section. Thus, space can be saved more as compared with the case where the images indicating the workflows and the second instruction receiving section are separately displayed.

(4) As described in Steps S21, S7 and S9, if there are a plurality of processing items selected by the user, what is searched by the searching section 603 is the workflow(s) including all the selected plurality of processing items. The workflow(s) including all the selected plurality of processing items is/are displayed on the operation screen (e.g. operation screen 47 (FIG. 7D)). Thus, the workflows to be displayed on the operation screen can be narrowed down, wherefore the user can more easily select the workflow.

Figure 7E:
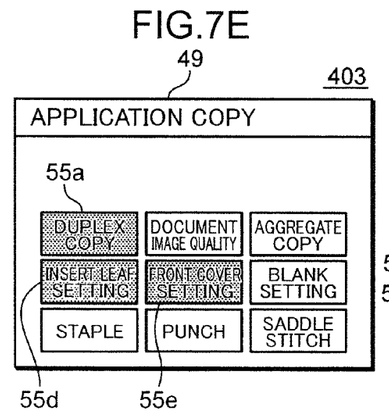
Figure 7F:
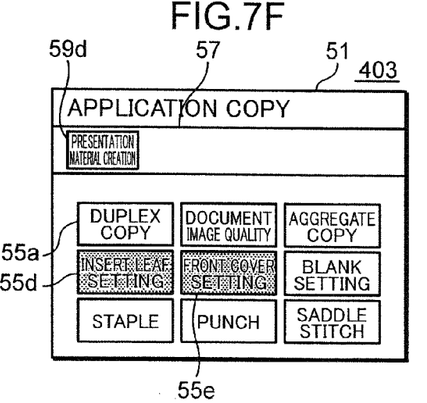

(5) As descried with reference to FIGS. 7E and 7F, if the selection of any one of the plurality of processing items selected on the operation screen 49 (first selection input section) is canceled, what is searched by the searching section 603 is the workflow(s) including all the processing items whose selection is not canceled. Thus, the user needs not execute the operation of searching the workflows from the beginning, wherefore convenience for the user is improved.

(6) The display controller 605 causes the display unit 403 to display the images indicating the plurality of processing items and the images indicating the workflows extracted by the searching section 603 together (e.g. operation screens 45, 47, 51). Thus, the user can grasp the plurality of processing items and the extracted workflows at once.

Figure 8:
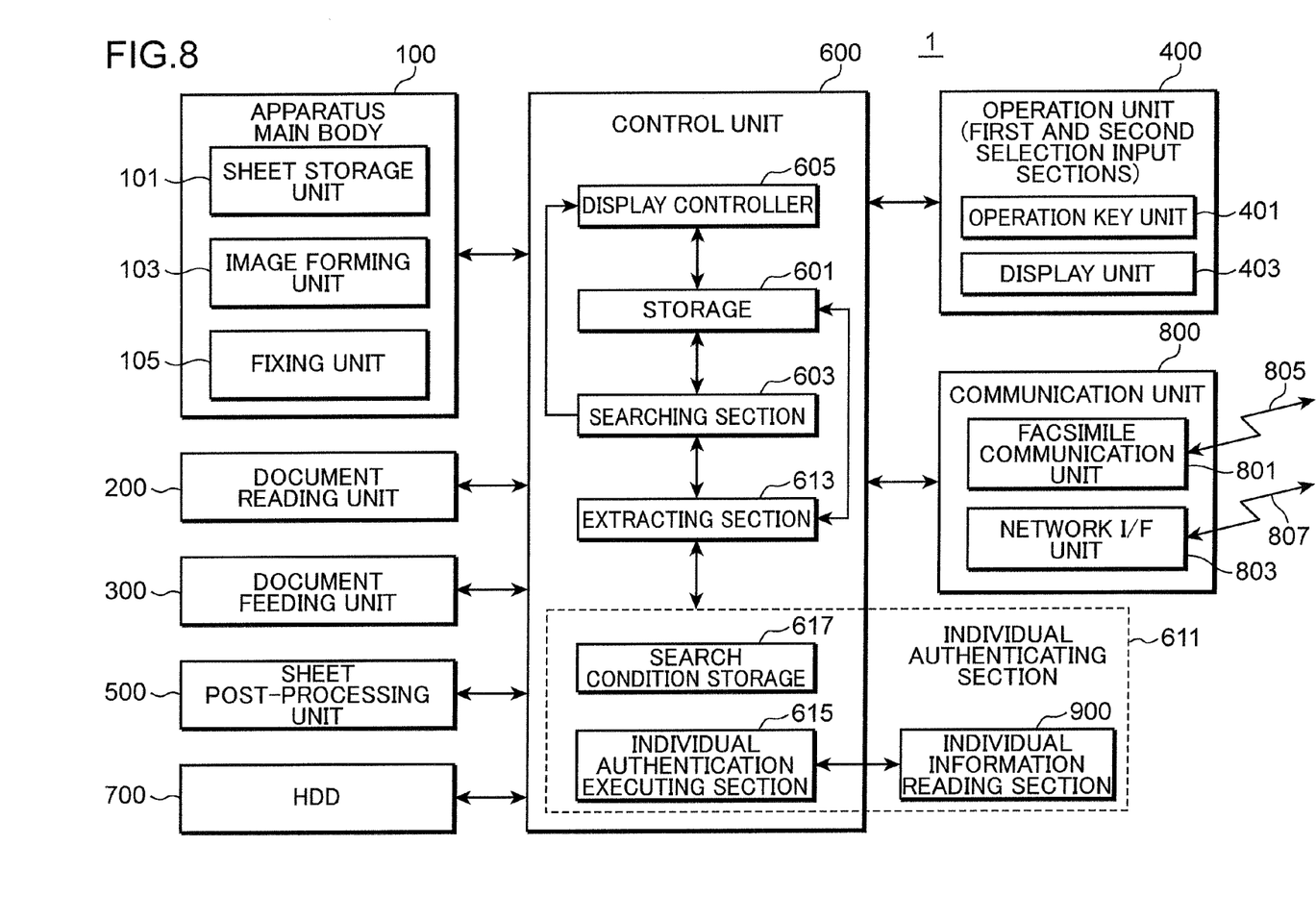
FIG. 8 is a block diagram showing an electrical construction of an image forming apparatus according to a second embodiment of the invention.

Next, a second embodiment of the present invention is described, mainly focusing on differences from the first embodiment. In the first embodiment, all the workflows stored in the storage 601 are searched. In the second embodiment, the workflows to be searched differ from user to user. FIG. 8 is a block diagram showing an electrical construction of an image forming apparatus 1 according to the second embodiment of the present invention and corresponds to FIG. 3. The construction shown in FIG. 8 includes an individual authenticating section 611 and an extracting section 613 in addition to the construction shown in FIG. 3.

The individual authenticating section 611 authenticates a user when the user uses the image forming apparatus 1. The individual authenticating section 611 includes an individual information reading section 900, a user authentication executing section 615 and a search condition storage 617. The individual information reading section 900 authenticates a user and reads individual information when the image forming apparatus 1 is used. If individual authentication is biometric authentication, a reader for reading biological information (e.g. fingerprint) is the individual information reading section 900. Further, if individual authentication is ID card authentication, a reader for reading an ID card is the individual information reading section 900.

The individual authentication executing section 615 and the search condition storage 617 are provided in a control unit 600. The individual authentication executing section 615 authenticates a user based on the individual information read by the individual information reading section 900.

Users, who can utilize workflows, and search conditions are registered (stored) in advance in the search condition storage 617. The search condition is determined for each user who can utilize the workflows for conditions of the workflows to be searched and, for example, as follows.

(1): All workflows currently registered in the storage 601

(2): Out of the workflows of (1), those registered at the time of shipment from a factory of the image forming apparatus 1

(3): The workflows of (2) and those commonly registered for the respective users (4): The workflows of (2) and those registered for the user authenticated by the individual authenticating section 900 (login user)

(5) The workflows of (3) and those registered for the user authenticated by the individual authenticating section 900

The individual authenticating section 611 has a function of authenticating users who can utilize the workflows by storing information on such users in the search condition storage 615 in advance.

The extracting section 613 is provided in the control unit 600. The extracting section 613 extracts the workflows to be searched from the plurality of workflows stored in the storage 601.

Figure 9:
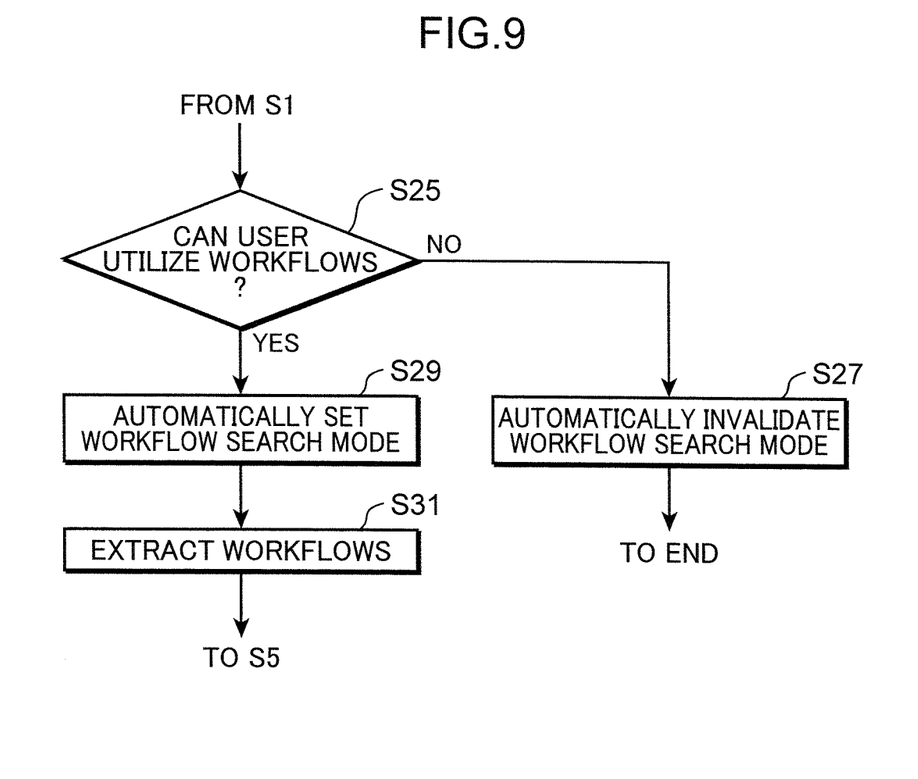
FIG. 9 is a flow chart showing a workflow search executed in the image forming apparatus according to the second embodiment.

Next, a workflow search in the second embodiment is described. FIG. 9 is a flowchart showing the workflow search executed in the image forming apparatus 1 according to the second embodiment. After the process in Step S1 shown in FIG. 6, the individual authenticating section 611 judges whether or not the authenticated user can utilize the workflows (Step S25).

If the user cannot utilize the workflows (NO in Step S25), the control unit 600 automatically invalidates the workflow search mode (Step S27). As a result, a workflow searching process is not performed.

On the other hand, if the user can utilize the workflows (YES in Step S25), the control unit 600 automatically sets the workflow search mode (Step S29).

The extracting section 613 extracts the workflows to be searched from the plurality of workflows stored in the storage 601 using the search condition of the user authenticated by the individual authenticating section 611 stored in the search condition storage 617 (Step S31). Then, Step S5 of FIG. 6 follows.

In Step S7, the searching section 603 searches the workflows from those extracted by the extracting section 613. The succeeding process is similar to that in the first embodiment.

Main effects of the second embodiment are described.

A range of the workflows to be searched differs depending on the user who utilizes the workflows. If all the workflows stored in the storage 601 are searched, there is a possibility that, when a workflow search is carried out for a certain user, a search result includes the workflows that are not utilized by this user.

Accordingly, in the second embodiment, the workflow search condition is determined for each user, whereby the range of the workflows to be searched is determined for each user. Thus, it can be excluded that the search result includes the workflows not utilized by the user, wherefore the user can efficiently select the workflows.

Further, if the user authenticated by the individual authenticating section 611 can utilize the workflows, the control unit 600 automatically sets the workflow search mode for searching the workflows by the searching section 603 as shown in Step S29. This enables the user to dispense with an operation of transferring to the workflow search mode.

This application is based on Japanese Patent application serial No. 2010-021850 filed in Japan Patent Office on Feb. 3, 2010, the contents of which are hereby incorporated by reference.

Although the present invention has been fully described by way of example with reference to the accompanying drawings, it is to be understood that various changes and modifications will be apparent to those skilled in the art. Therefore, unless otherwise such changes and modifications depart from the scope of the present invention hereinafter defined, they should be construed as being included therein.

What is claimed is:

1. An operating device, comprising:
    a display unit;
    a storage storing a plurality of workflows, each of which is composed of a combination of a predetermined plurality of processing items out of a plurality of processing items of an image forming apparatus including the operating device, in advance;
    a first selection input section for inputting the selection of a processing item out of the plurality of processing items of the image forming apparatus;
    a searching section for searching a workflow including the same processing item as the selected processing item from the plurality of workflows stored in the storage when the selection of the processing item is input by the first selection input section; and
    a display controller for controlling the display unit to display an image indicating the extracted workflow as a search result by the searching section, wherein
    the display controller controls the display unit to display a menu screen that includes a plurality of selecting keys as the first selection input section when the image forming apparatus is in a mode other than a workflow mode,
    when any of the selecting keys is operated, the searching section searches the storage for the workflow that includes the same processing item as the processing item allocated to the operated selecting key, and
    when the searching section searches in the workflow that includes the same processing item as the processing item allocated to the operated selecting key, the display controller controls the display unit to display the menu screen including the image indicating the workflow that includes the same processing item.

2. An operating device according to claim 1, further comprising:
    a second selection input section for inputting the selection of the workflow with the menu screen including the image indicating the workflow extracted by the searching section displayed on the display unit;

wherein the display controller controls the display unit to display an operation screen for the selected workflow when the selection of the workflow is input by the second selection input section.

3. An operating device according to claim 2, wherein the display controller controls the display unit to display an operation screen for the selected workflow with a set value for the processing item selected by the first selection input section held when the selection of the workflow is input by the second selection input section.

4. An operating device according to claim 2, wherein:
the display unit has a touch panel function; and
the second selection input section includes a soft key displayed on the display unit and including an image indicating the extracted workflow as the search result by the searching section.

5. An operating device according to claim 1, wherein what is searched and extracted by the searching section when the selection of a plurality of processing items is input by the first selection input section is the workflow including all the selected plurality of processing items.

6. An operating device according to claim 5, wherein what is searched and extracted by the searching section when the selection of any one of the plurality of processing items selected by the first selection input section is canceled is the workflow including all the processing items whose selection is not canceled.

7. An operating device according to claim 1, further comprising:
an individual authenticating section for authenticating a user who can utilize the workflows;
a search condition storage storing search conditions for determining conditions of the workflows to be searched in advance for each user; and
an extracting section for extracting the workflows to be searched from the plurality of workflows stored in the storage using the search condition of the user authenticated by the individual authenticating section stored in the search condition storage,
wherein the searching section searches the workflows from those extracted by the extracting section.

8. An operating device according to claim 7, further comprising a control unit for automatically setting a workflow search mode, in which the workflows are searched by the searching section, when the user authenticated by the individual authenticating section can utilize the workflows.

9. An operating device according to claim 1, wherein the display controller causes the display unit to display images indicating the plurality of processing items and images indicating the workflows extracted by the searching section together.

10. An image forming apparatus, comprising:
an operating device; and
an image forming unit for performing an image forming operation on a sheet based on a set value of a processing item set in the operating device,
wherein the operating device includes:
a display unit;
a storage storing a plurality of workflows, each of which is composed of a combination of a predetermined plurality of processing items out of a plurality of processing items of the image forming apparatus, in advance;
a first selection input section for inputting the selection of a processing item out of the plurality of processing items of the image forming apparatus;
a searching section for searching a workflow including the same processing item as the selected processing item from the plurality of workflows stored in the storage when the selection of the processing item is input by the first selection input section; and
a display controller for controlling the display unit to display an image indicating the extracted workflow as a search result by the searching section, wherein
the display controller controls the display unit to display a menu screen that includes a plurality of selecting keys as the first selection input section when the image forming apparatus is in a mode other than a workflow mode,
when any of the selecting keys is operated, the searching section searches the storage for the workflow that includes the same processing item as the processing item allocated to the operated selecting key, and
when the searching section searches in the workflow that includes the same processing item as the processing item allocated to the operated selecting key, the display controller controls the display unit to display the menu screen including the image indicating the workflow that includes the same processing item.

11. An image forming apparatus according to claim 10, wherein:
the operating device further includes a second selection input section for inputting the selection of the workflow with the menu screen including the image indicating the workflow extracted by the searching section displayed on the display unit; and
the display controller controls the display unit to display an operation screen for the selected workflow when the selection of the workflow is input by the second selection input section.

12. An image forming apparatus according to claim 11, wherein the display controller controls the display unit to display an operation screen for the selected workflow with a set value for the processing item selected by the first selection input section held when the selection of the workflow is input by the second selection input section.

13. An image forming apparatus according to claim 11, wherein:
the display unit has a touch panel function; and
the second selection input section includes a soft key displayed on the display unit and including an image indicating the extracted workflow as the search result by the searching section.

14. An image forming apparatus according to claim 10, wherein what is searched and extracted by the searching section when the selection of a plurality of processing items is input by the first selection input section is the workflow including all the selected plurality of processing items.

15. An image forming apparatus according to claim 14, wherein what is searched and extracted by the searching section when the selection of any one of the plurality of processing items selected by the first selection input section is canceled is the workflow including all the processing items whose selection is not canceled.

16. An image forming apparatus according to claim 10, further comprising:
an individual authenticating section for authenticating a user who can utilize the workflows;
a search condition storage storing search conditions for determining conditions of the workflows to be searched in advance for each user; and
an extracting section for extracting the workflows to be searched from the plurality of workflows stored in the storage using the search condition of the user authenticated by the individual authenticating section stored in the search condition storage; and the searching section searches the workflows from those extracted by the extracting section.

17. An image forming apparatus according to claim 16, further comprising:
a control unit for automatically setting a workflow search mode, in which the workflows are searched by the searching section, when the user authenticated by the individual authenticating section can utilize the workflows.

18. An image forming apparatus according to claim 10, wherein the display controller causes the display unit to display images indicating the plurality of processing items and images indicating the workflows extracted by the searching section together.

* * * * *